March 21, 1950 M. C. TATE 2,501,623
LOW LOAD WEIGHING ACCESSORY FOR TESTING MACHINES
Filed March 25, 1947 2 Sheets-Sheet 1

INVENTOR
MALCOLM C. TATE
BY
ATTORNEY

March 21, 1950 M. C. TATE 2,501,623
LOW LOAD WEIGHING ACCESSORY FOR TESTING MACHINES
Filed March 25, 1947 2 Sheets-Sheet 2
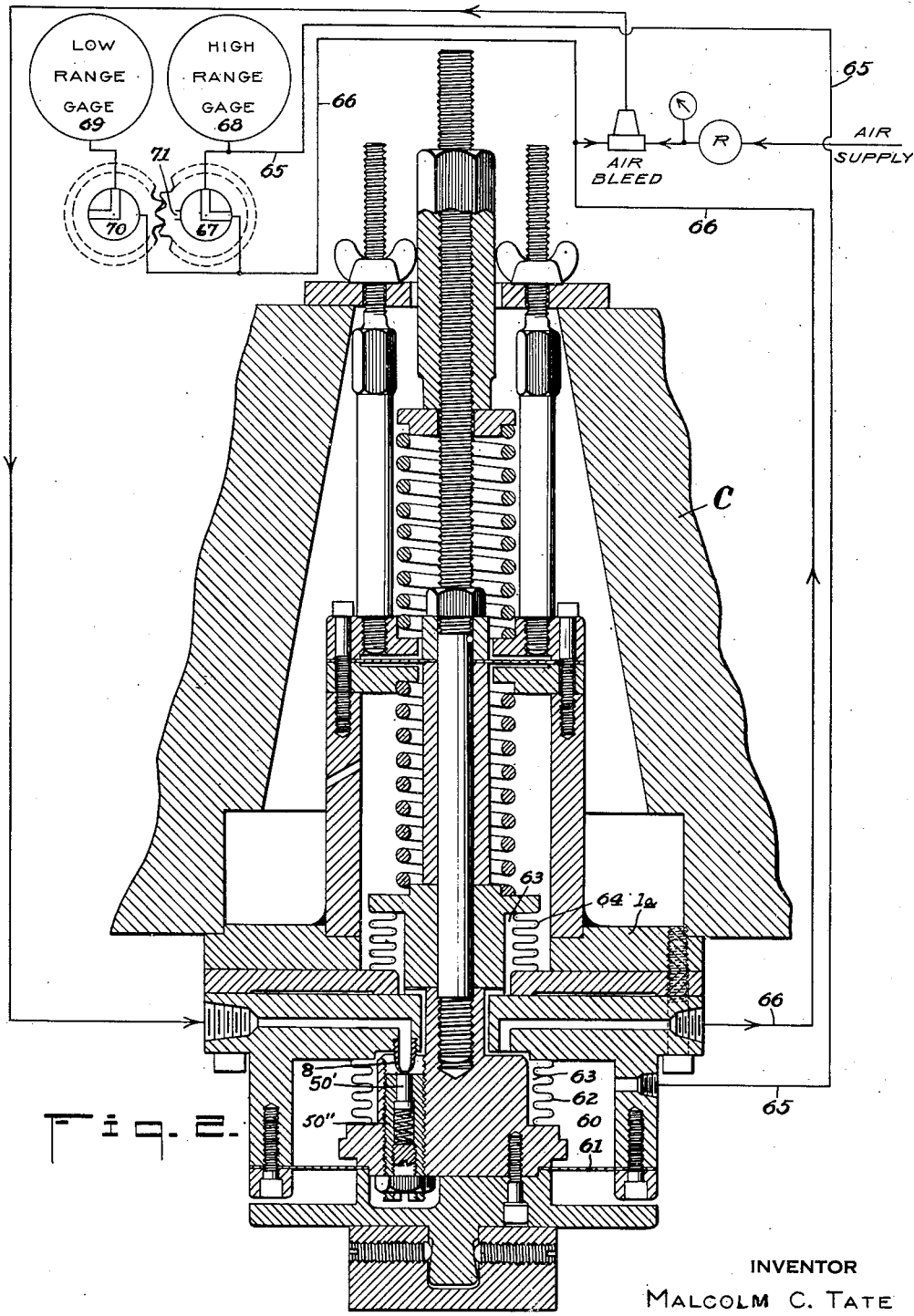
Fig. 2.
INVENTOR
MALCOLM C. TATE
BY
ATTORNEY Patented Mar. 21, 1950

2,501,623

UNITED STATES PATENT OFFICE 2,501,623

LOW LOAD WEIGHING ACCESSORY FOR TESTING MACHINES

Malcolm C. Tate, Stamford, Conn., assignor to The Baldwin Locomotive Works, a corporation of Pennsylvania Application March 25, 1947, Serial No. 736,922

8 Claims. (Cl. 265—27)

This invention relates generally to materials testing machines and more particularly to a low load pneumatic weighing system for use with a materials testing machine and which is especially adapted to be used as a low load accessory to be inserted in a testing machine whose normal load capacity is relatively high.

The large materials testing machines of the type herein described, designed to weigh loads up to many thousands of pounds, are usually limited in their ability to weigh loads in the hundreds of pounds and are consequently not useful to users who may have need to weigh loads in both categories. While my pneumatic weighing system disclosed herein may be used with any type of force producing or dynamometer apparatus, yet it is particularly useful in materials testing machine that applies the load in one direction only for both compression and tension. The particular type of materials testing machine illustrated and described herein is that of Patents 1,848,463 and 2,212,085 although obviously my improved device may be employed with any other type of machine or loading apparatus having opposed members between which a specimen or element is positioned to have a force applied thereto. Such opposed members are usually crossheads or platens and are hereinafter both broadly referred to as load platens.

In using my pneumatic weighing system in a materials testing machine, the usual grips and compression head in the customary sensitive crosshead of the machine are dispensed with and the force responsive unit of my system is positioned in their place and then provided with a compression surface and means to which grips may be attached. I thereby make use of the conical grip recess normally provided in the sensitive crosshead or in any other force resisting crosshead for that matter such as a stationary crosshead as in a machine adapted only for compression. However, in a sensitive crosshead the recess extends vertically therethrough so that the load may be weighed either in compression or tension applied directly to the responsive unit. The normal weighing and indicating systems of the materials testing machine are not used when my accessory unit is used during the weighing of low loads and such systems may be disconnected or disregarded at such times.

An object of my invention is to provide an improved low load pneumatic weighing apparatus that is relatively simple and economical in construction, operation, and maintenance while at the same time obtaining a high degree of accuracy, sensitivity and responsiveness.

Another object is to provide an improved low load weighing apparatus having the foregoing characteristics and which is adapted to function as a convenient accessory for ready attachment to, or removal from, a materials testing machine whose normal load weighing capacity is considerably greater than that of my improved apparatus thereby increasing the range of usefulness of the testing machine.

A further object is to provide an improved weighing unit having multiplicity load ranges together with the many desirable structural and functional characteristics of the above objects.

Other objects and advantages will be more apparent to those skilled in the art from the following description of the accompanying drawings in which:

Fig. 2 is a sectional elevational view of a modification of my weighing system.

Figures 1, 1A:
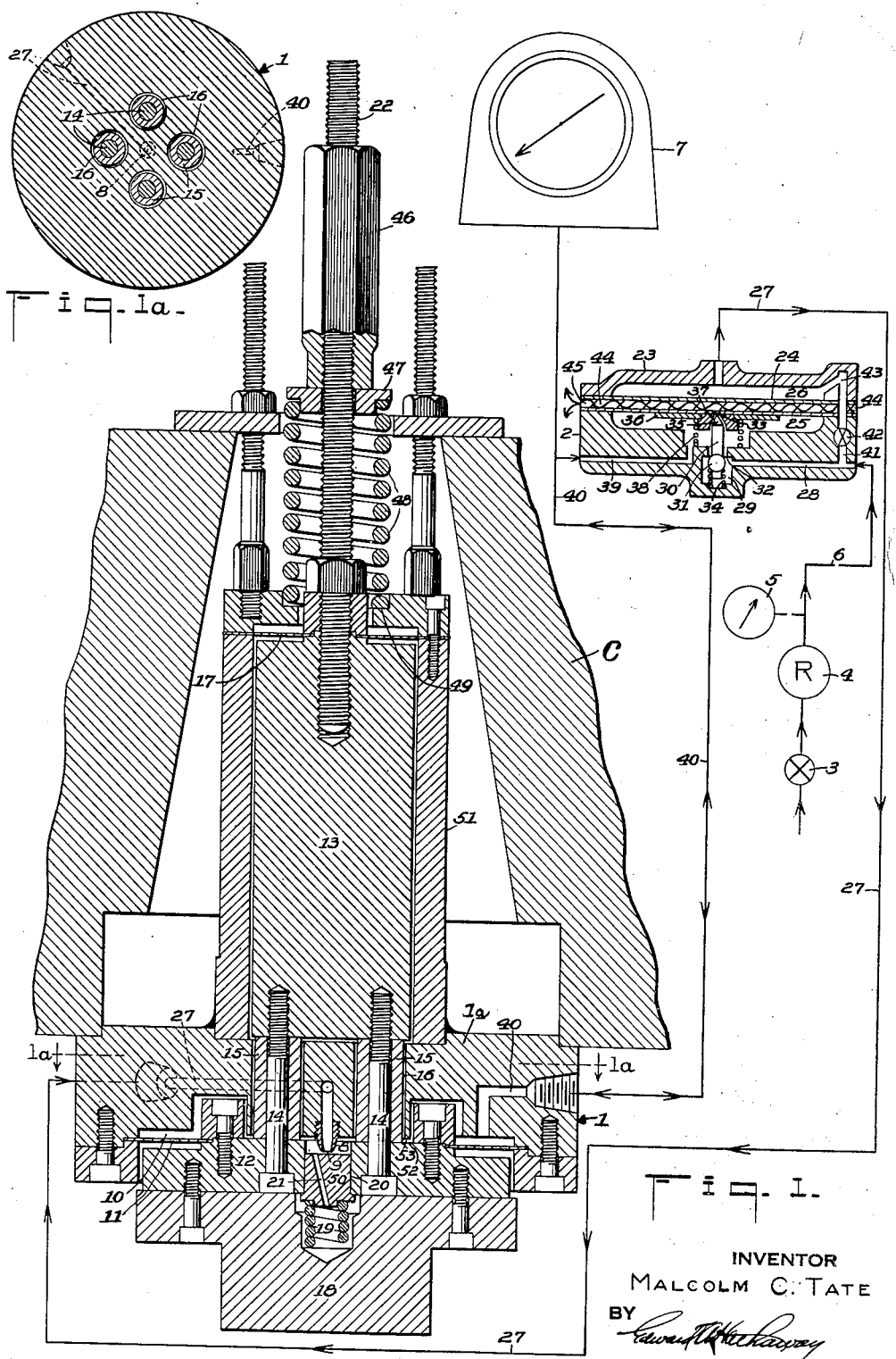
Fig. 1 is a sectional elevational view of my pneumatic weighing system mounted within a recess in the sensitive platen of a materials testing machine of the type herein described.
Fig. 1a is a horizontal section taken on line 1a—1a of Fig. 1.

In the particular embodiment of the invention which is described herein merely for the purpose of illustrating one specific form among possible others that the invention might take in practice, I have shown in Fig. 1 a weighing unit 1 clamped within the conical recess of a sensitive platen or crosshead C or a materials testing machine of the type herein described. To weighing unit 1 is connected a booster pilot 2 forming an element of a pneumatic transmission system used with my weighing unit and described in U. S. Patent 2,359,236 of Coleman B. Moore.

A source of supply of filtered and pressure fluid, such as air, is provided, and is fed through supply valve 3 into pressure regulator 4, which holds the pressure at a constant value as shown on gauge 5, and is thence fed by pipe 6 into the booster pilot 2. The weighing unit 1 and the booster pilot 2 are also connected to a suitable instrument 7, for indicating, recording, or controlling, and the instrument 7 may be graduated in units of external force applied to weighing unit 1. The instrument 7 may be at a remote location with respect to weighing unit 1 and also to booster pilot 2, although preferably booster pilot 2 will be integrally mounted with instrument 7.

The weighing unit 1 includes a suitable pressure control member, preferably in the form of a supply nozzle 8 fixed into unit 1. The supply nozzle 8 has an orifice 9 therein and a baffle surface formed on the upper end of a plug 50 is associated with a piston or load responsive portion for controlling the discharge through the orifice 9. The load responsive portion comprises parts 18, 12 and 13 which preferably form part of a fluid tight expansible chamber 10 by reason of an annular flexible diaphragm 11 being clamped at its inner edge to part 12 and at its outer edge to an element 51 of an elongated casing, and a smaller annular flexible diaphragm 17 clamped at its inner and outer edges. As shown in Fig. 1 the piston parts 18, 12 and 13 are inflexibly joined together by bolts 14 and sleeves 15, the bolts and sleeves passing through clearance holes 16 in casing base 1 as shown in Fig. 1a. A shouldered plug 50, freely vertically movable in its seat 20, is continuously biased upward against its shoulder by compression spring 19. A hole 21 passes through plug 50 so that there will be no difference in the fluid pressure above and below the plug 50. The function of plug 50 with its shoulder and compression spring is to provide a resistable surface so that orifice 9 would not be damaged in the event of accidental severe vertical load applied to the load responsive portion. The expansible chamber 10 thus provided, has an effective area equal to the area of diaphragm 11 less the area of diaphragm 17.

The load responsive portion also includes threaded rod 22 which fastens into part 13, and extends upward. A vertical force applied to part 18, or a vertical force applied to the upper end of rod 22, each exert upward force on the load responsive system. The fluid pressure in chamber 10 shall adjust itself so as to automatically balance the upward force and this required fluid pressure is transmitted to instrument 7 as previously explained.

Threaded rod 22 has an adjustable unit 46, collar 47 and helical compression spring 48 whose lower end is mounted in recess 49 in the upper end of casing element 51 of the main body of unit 1. The complete casing includes not only element 51 but also its lower enlarged base 1a. The casing has an elongated form as is seen from the nature of the element 51. Nut 46 is tightened so that any desired compression force is exerted by spring 48, thereby providing a means for establishing any desired initial loading of force responsive system 18, 12, 13, 22, to give any desired initial balance pressure of pressure fluid in chamber 10.

The free end of the pressure control member or supply nozzle 8 is preferably initially located at the desired distance from flat upper surface of plug 50. As hereinafter explained in detail, upon rebalancing, the same differential pressure will prevail across the orifice 9 and the dimensional relationship of the upper surface of plug 50 with respect to orifice 9 will be such that a linear characteristic of the transmitted pressure is obtained.

The booster pilot 2 preferably includes a lower casing 2 and an upper section 23 secured together by screws and with a flexible diaphragm 24 interposed between to provide suitable chambers 25 and 26. A pipe 27 is connected from the pressure chamber 26 above the diaphragm 24 to the interior of the supply nozzle 8 of the weighing unit 1. The lower casing 2 has a supply pipe 6 connected thereto, and a passageway 28 in communication with the supply pipe 6 leads to a chamber 29 within the lower casing 2.

A valve stem 30 is provided, and connected to the diaphragm 24 for movement therewith in accordance with the pressure conditions in the chambers 25 and 26. The lower end of the valve stem 30 is provided with a seating member preferably shown as a ball 31. A valve seat member 32 is provided, carried by the lower casing 2 and the ball 31 is adapted to be spaced therefrom in accordance with the positioning of valve stem 30, to control the delivery of supply fluid to the chamber 25 from the chamber 29. The pressure of the supply fluid delivered from the chamber 29 to the chamber 25 is thus controlled in accordance with the positioning of the diaphragm 24. Fluid is discharged from the chamber 25, as hereinafter pointed out through passageway 33.

A compression spring 34 is provided, in engagement with the valve member 30 for biasing the same upwardly, the force exerted by the spring 34 being superior to the dead weight of valve member 30.

The upper end of valve member 30 has a seating construction, preferably shown as a conical point 35. A disc 36 attached to diaphragm 24 contains a valve seat 37 so that relative motion between conical point 35 and valve seat 37 controls the flow through passage 33.

A compression spring 38 is provided, in engagement with disc 36 and diaphragm 24 for biasing the same upwardly, the force exerted by the spring 38 being predetermined in accordance with the differential desired between the pressures in the chamber 25 and in the chamber 26, and so that a higher pressure will normally be available in the chamber 26 than in the chamber 25. The chamber 25 is in communication, through passage 39 and pipe line 40 which communicates with pressure chamber 10 in the weighing unit 1 and with the instrument 7.

A supply passage 41 is also provided, in communication with a restriction member or orifice 42. The discharge side of the orifice 42 is in communication with the chamber 26 through passage 43, and therefrom through pipe 27 to supply nozzle 8 in the weighing unit.

Diaphragm 24 comprises two sheets of fluid tight material between which is a layer of porous flexible material 44. The lower sheet of diaphragm 24 has a hole in it so that pressure fluid may flow from passage 33 into the porous material 44 and thence escape at 45 to the exterior of the booster pilot 2.

*Operation.*—It will be assumed that the system is in a balanced or normal condition. Supply fluid passes through valve 3 thence through pressure regulator 4 where the supply pressure is reduced and held constant as shown by pressure gauge 5. A portion of the supplied fluid passes through the passage 41, through orifice 42 and thence into chamber 26. The pressure in the chamber 26 is effective on the upper face of the diaphragm 24. Fluid from the chamber 26 is delivered through pipe 27, and the supply nozzle 8 and discharges through the orifice 9 into the pressure chamber 10. The discharge of fluid through the orifice 9 is controlled by the spacing of the upper surface of plug 50 with respect to the orifice 9 and this in turn controls the pressure on the inlet side of the orifice 9. The chamber 10 in the weighing unit 1 is in free communication with the chamber 25 below the diaphragm 24, through the pipe 40 and passage 39 so that the same pressure prevails in chamber 10 and chamber 25.

Supply fluid from pipe 6 is also delivered through passage 28 to the space 29 and therefrom past the valve seating member 31 and the valve seat 32 to the chamber 25 below the diaphragm 24. The pressure of the fluid supplied to the chamber 25 is controlled by the extent of the opening of the valve stem 30, with its ball 31, with respect to the valve seat 32 and will normally be less than that effective in the chamber 26 because of the force exerted by spring 38.

Fluid is also discharged from the pressure chamber 25 through the passage 33, and the discharge is controlled by the positioning of the discharge control valve 35 with respect to the seat 37. The resultant of the pressure in the chamber 26 and in the chamber 25 determines the positioning of the diaphragm 24 which contains seat 37 with its opening into the porous material 44 and thence to the exterior of the booster pilot 2. For equilibrium conditions only a minimum quantity of fluid is discharged.

Pressure fluid will thus be supplied by the pipe 6 and delivered at differing pressures to the chambers 25 and 26. Fluid will be supplied from the chamber 26 through the pipe 27 to the supply nozzle 8 and will flow through the orifice 9 into the chamber 10 of the weighing unit 1. A constant differential pressure will thus prevail on opposite sides of the orifice 9; and the plug 50 will occupy a dimensional relationship with respect to the nozzle 8 attendant upon the maintenance of the constant differential pressure. The pilot valve 30 of the booster pilot 2 will be positioned by reason of the pressures prevailing in the chambers 25 and 26 so as to permit a very small flow from the supply to the chamber 25 in the balanced position. The discharge control valve 35 will be positioned by the resultant of the pressures prevailing in the chambers 25 and 26 and will normally permit a slight leakage or bleed through the passage 33 and through the porous material 44 to the outside of the booster pilot 2.

The system is in balanced condition and ready for response to the effect of a vertical force applied to the load responsive portion 18, 12, 13 and 22 of weighing unit 1.

Upon a gradual or slow increase in the vertical force acting on the load responsive portion 18, 12, 13, 22 of unit 1 there will be a gradual or slow tendency of plug 50 to move toward supply nozzle 8 against the downward force of the pressure in chamber 10. The flow through the orifice 9 will be decreased by reason of the closer spacing of surface of the plug 50 with respect to the orifice 9. This will cause a building up of pressure within the pipe 27 and within the chamber 26. This increase in pressure will tend to move the diaphragm 24 downward thereby closing discharge control valve 35 so that momentarily no flow passes out through the porous material 44. Further downward movement of the diaphragm 24 carries the valve stem 30 and its seating ball 31 further away from valve seat 32, and permits an increase of pressure to be effective in chamber 25. The increased pressure in chamber 25 is also effective through pipe 40 to chamber 10 in the weighing unit 1 thereby causing the load responsive portion with plug 50 to move downward with respect to supply nozzle 8 to maintain a constant differential or pressure drop across the orifice 9. By reason of the maintenance of this constant differential or pressure drop across the orifice 9 the slight movement of the load responsive portion 18, 12, 13, 22 which occurs has a linear characteristic and upon rebalancing a linear characteristic of transmitted pressure is provided.

The pressure within chamber 25 is effective through the pipe 40 for transmission to the instrument 7 for indicating, recording, or controlling. The pressure relationship thus established in the chambers 25 and 10 will be directly proportional to the force applied to the load responsive portion 18, 12, 13, 22 of the weighing unit 1.

Upon a decrease in the vertical force acting on the load responsive portion 18, 12, 13, 22 of the weighing unit the reverse of the action above described for an increase of force, will occur.

Upon a sudden application or removal of force on the load responsive portion 18, 12, 13, 22, the events occur in the same manner as described but with greater speed in accordance with greater magnitudes of valve action and flow.

While the system could be operated with proportioning of the passage 33 so that the same would serve as a constant bleed, the control of the discharge by changes of pressure of the chamber 25 and 26 is desirable for reducing the quantity of supply fluid required for affecting a more rapid rate of response of the system as required.

Diaphragms 11 and 17 act not only as vertically flexible diaphragms as described above, but also provide horizontal staying so that load responsive portion 18, 12, 13, 22 is held central with the outer housing 1 and 51.

The control nozzle 8 and plug 50 are located on the vertical center line of the load responsive portion 18, 12, 13, 22 so that when a vertical load is applied anywhere on the lower surface of compression head 18 the dimensional relationship between orifice 9 and plug 50 is not changed by any straining of parts, such as bolts 14 or sleeves 15. In the modification of Fig. 2, to be described presently, a spring biased nozzle baffle plug 50', corresponding to plug 50 of Fig. 1, is located to one side of the vertical center line of the device and is mounted in a removable threaded sleeve 50''.

If excessive load is applied, far beyond the normal capacity of the weighing unit 1, surfaces 52 and 53 will come into contact.

*Fig. 2 modification.*—Referring to Fig. 2, a weighing unit is shown that has an expansible chamber utilizing either of two areas, thereby giving two capacity ranges. The general method of operation is the same as previously described for Fig. 1. When the high range is being used, the valving is as shown on Fig. 2. The expansible chamber consists of chamber 60 as defined by diaphragm 61 and bellows 62 plus chamber 63 as defined by bellows 64 and bellows 62 because these chambers are inter-connected by pipe lines 65 and 66 through valve 67. The net operating area of the expansible chamber is equal to the effective area of diaphragm 61 less the effective area of bellows 64. This is a relatively large net area. Pipe line 65 is connected to instrument 68 which is graduated to read in pounds of force applied to the weighing unit.

When the low range is being used, valve 67 is turned counter-clockwise 90° and valve 70 clockwise 90°, these two valves being geared together as shown. The expansible chamber now consists of chamber 63 as defined by bellows 62 and bellows 64. Chamber 60 is defined by diaphragm 61 and bellows 62 connected through pipe line 65, valve 67 to atmospheric port 71. Note that instrument 68 is now at zero pressure. The net effective area of the expansible chamber is equal to the effective area of bellows 62 less the effective area of bellows 64. This is a relatively small area.

Pipe line 66 is connected to instrument 69 which is graduated to read in pounds of force applied to the weighing unit.

It is difficult to construct an instrument such as 69 which will operate full scale for a very small change in operating pressure. By using the small net effective area as described above for low range of load operation, the change of fluid pressure transmitted to instrument 69 may be as large as the change of fluid pressure transmitted in instrument 68 for high range of load operation.

From the disclosure herein it is seen that I have provided a simple, expedient and accurate pneumatic weighing system that is particularly adapted for use with materials testing machines to weigh loads in load ranges below those for which the testing machine may have been originally designed.

It will of course be understood by those skilled in the art that various changes may be made in the construction and arrangement of parts without departing from the spirit of the invention as set forth in the appended claims.

I claim:

1. A load weighing apparatus constituting a self contained unit adapted to be bodily attached to or removed from a materials testing machine load platen comprising, in combination, an axially elongated casing element, means for removably securing the same to the load platen of the testing machine, an axially extending inflexible load responsive element disposed within said casing to move axially freely therein and having a portion extending axially beyond an end of said elongated casing for connection to a specimen to be loaded, two axially spaced annular flexible diaphragms whose inner and outer edges are secured respectively to the ends of the elongated casing and to the load responsive element to guide the same axially and a fluid expansible chamber, at least one of said diaphragms forming a fluid receiving wall of said expansible chamber, a pressure supply nozzle mounted on one of said elements to discharge fluid under pressure into the expansible chamber, and a baffle carried by the other of said elements and positioned with respect to the pressure supply nozzle so that the distance between the baffle and the nozzle and the flow of fluid pressure therethrough varies upon movement of the load responsive element in response to an applied load.

2. The combination set forth in claim 1 further characterized by the provision of a preloading spring for biasing the jet and baffle relatively toward each other.

3. The combination set forth in claim 1 further characterized by the provision of a preloading spring supported at one end on the outside of said casing and the other end being supported by said load responsive element to bias the same in a direction so as to require an initial fluid pressure in said chamber before load is applied.

4. The combination set forth in claim 1 further characterized by the provision of a tension load transmitting member secured to said load responsive element, and a preloading spring connected at one end to said casing and at the other end to said tension load member to bias the same in a direction so as to require an initial fluid pressure in said chamber before load is applied.

5. The combination set forth in claim 1 further characterized in that the portion of said load responsive element projecting beyond one end of said casing provides a compression surface, and said portion has a bore within which said baffle element is disposed.

6. A load weighing apparatus comprising in combination a testing machine crosshead having a vertical bore, a self contained load weighing unit having a casing element with a base portion and an axially extending portion, said axially extending portion being axially receivable within said bore and said base being engageable with one side of said crosshead, means engageable with the other side of said crosshead for securely axially holding said casing in its aforesaid position, an axially movable load responsive member disposed within said casing, a diaphragm for laterally guiding said load responsive member and for forming a fluid receiving wall of a fluid chamber in said casing, said diaphragm being connected to said movable member and casing, and air jet and baffle elements respectively carried by said casing and said movable element so that the jet discharges into said chamber.

7. A load weighing apparatus for use with a materials testing machine comprising, in combination, a casing element having two fluid expansible chambers, one having a larger effective area than the other, valve means adapted in one position to connect the expansible chamber having the large effective area with the atmosphere and in another position to connect the two expansible chambers with each other, a fluid supply nozzle carried by the casing and positioned to supply fluid from a constant pressure source into one or both expansible chambers depending on the position of said valve means, a load responsive element for varying said expansible chambers, and a baffle carried by the load responsive element and placed with respect to the nozzle so that said movement of the load responsive element will vary the amount of fluid pressure discharging from the nozzle into one or both expansible chambers depending on the position of the valve means, and thereby increase or decrease the fluid pressure in one or both of said chambers in accordance with whether the load increases or decreases.

8. A load weighing apparatus as defined in claim 7 further characterized in that the valve means comprises two two-way valves geared together in such relationship that when in one position one valve connects the two expansible chambers with each other and the second valve is ineffective, and that in another position when the second valve connects with only the expansible chamber having the smaller effective area the first valve connects the expansible chamber having the larger effective area with the atmosphere.

MALCOLM C. TATE.

REFERENCES CITED

The following references are of record in the file of this patent:

UNITED STATES PATENTS

| Number | Name | Date |
|---|---|---|
| 552,873 | Sellers et al. | Jan. 7, 1896 |
| 1,848,468 | Emery, Jr. | Mar. 8, 1932 |
| 2,212,085 | Tate | Aug. 20, 1940 |
| 2,296,160 | Gross | Sept. 15, 1942 |
| 2,359,236 | Moore | Sept. 26, 1944 |